United States Patent [19]

Burnett et al.

[11] 4,275,401

[45] Jun. 23, 1981

[54] METHOD AND APPARATUS FOR SORTING AND DEFLECTING DROPS IN AN INK JET DROP RECORDER

[75] Inventors: James E. Burnett, Xenia; John A. Robertson, Chillicothe, both of Ohio

[73] Assignee: The Mead Corporation, Dayton, Ohio

[21] Appl. No.: 95,175

[22] Filed: Nov. 16, 1979

[51] Int. Cl.³ .................................. G01D 15/18
[52] U.S. Cl. ................................ 346/75; 346/1.1
[58] Field of Search ............................ 346/75, 1

[56] References Cited

U.S. PATENT DOCUMENTS

| | | | |
|---|---|---|---|
| 3,500,436 | 3/1970 | Nordin | 346/75 |
| 3,579,245 | 5/1971 | Berry | 346/75 X |
| 3,689,936 | 9/1972 | Dunlavey | 346/75 |
| 3,698,002 | 10/1972 | Appel | 346/75 X |
| 3,715,219 | 2/1973 | Kurz et al. | 346/75 UX |
| 3,739,395 | 6/1973 | King | 346/75 |
| 4,027,310 | 5/1977 | Baker et al. | 346/75 |
| 4,086,602 | 4/1978 | Yamada | 346/75 |
| 4,123,760 | 10/1978 | Hou | 346/75 |

Primary Examiner—George H. Miller, Jr.
Attorney, Agent, or Firm—Biebel, French & Nauman

[57] ABSTRACT

Method and apparatus for sorting and deflecting a progression of liquid particles by selectively applying electrical charges of varying amplitude and subjecting the charged particles to the influence of an electrically conductive surface while the particles are subjected to an electric field such that sufficiently charged particles will be deflected laterally of the electrically conductive surface. This results in higher charged particles being deflected to a catching mechanism and the lower charged particles being directed onto a recording medium at locations selectively laterally displaced from their original trajectories.

19 Claims, 5 Drawing Figures

METHOD AND APPARATUS FOR SORTING AND DEFLECTING DROPS IN AN INK JET DROP RECORDER

BACKGROUND OF THE INVENTION

1. Field of the Invention

The present invention relates generally to particle sorting apparatus of the type wherein a progression of particles are projected through space towards a recording medium and the particles are selectively diverted from or permitted to impact the recording medium, and more particularly, to such apparatus wherein the particles are diverted in two orthogonal planes normal to the plane of the recording medium.

2. Prior Art

A recorder of the type to which the present invention generally relates is disclosed for example in Sweet et al U.S. Pat. No. 3,373,437. Such devices basically comprise a recording head having an ink supply manifold provided with a plurality of orifices aligned in a plane and means for creating a series of uniform progressions of drops in the plane of the orifices such that they will impinge on a recording medium disposed beneath the orifices and moving in a direction perpendicular to the plane containing the orifices. Devices of this nature are used to record printed matter or produce facsimiles in a well known manner.

Initially, such devices merely provided a print-no-print control over each drop or plurality of drops coming from each orifice in order to produce the desired image on the recording medium. It was discovered, however, that in order to increase the resolution of the image produced on the recording medium with this type of system, it was necessary to increase the density of orifices in the manifold. This required miniaturization of much of the hardware associated with each orifice, for example, the charging electrodes utilized to deflect drops, and it therefore resulted in practical limitations in density of the orifices.

One means devised to overcome this difficulty is proposed in King U.S. Pat. No. 3,739,395 in which multiple deflection electrodes are utilized to deflect charge droplets in two orthogonal directions perpendicular to the print medium. In this type of device two sets of spaced electrodes are disposed downstream of the supply of drops, below the charging electrodes which place a desired level of charge on the drops in a well known manner. The device prevents uncharged drops from impacting the recording medium and diverts charged drops in two orthogonal directions to impact on the recording medium at a desired location which is controlled by the charge level on the deflection electrodes.

It has also been suggested that deflection of charged drops into a catching mechanism in order to avoid impingement on the recording medium can be accomplished by self-induced image charges imposed on an electrically conductive surface disposed adjacent the trajectory of drops issuing from the orifice. See, for example, U.S. Pat. No. 3,656,171. This permits control of drop deposition on the recording medium, but does not provide for lateral displacement of the drops in order to adjust the location of drop deposition on a recording medium in two orthogonal directions. It is essentially a go-no-go control in which drops are either prevented or permitted to land upon the recording medium on a single trajectory.

SUMMARY OF THE INVENTION

The present invention is an improvement over the above referred to prior art types of devices. It provides a means for controlling the trajectory of liquid particles or drops expelled from a series of orifices, by combining the attractive effect of a self-induced image charge with the deflecting effect of an external electrical field. With the combined effects of the self-induced image charge and the electrical field, selectively charged liquid particles expelled from the orifices can be directed in two orthogonal planes normal to the surface of the recording medium and thus, either be caught so as not to impact the recording medium, or be positioned at a desired location on the recording medium at a position other than on the initial trajectory of the liquid particles.

A charging electrode is placed immediately adjacent the orifice from which the liquid particles or drops are expelled, in order to produce a selective charge on the drops coming from the orifice. The charge can be positive, negative, or zero, depending upon the desired effect to be created on the particle as it passes the electrically conductive surface which produces the image charge and as it passes through the electric field subsequent to the charging electrode.

A variety of positions and combinations of the electrically conductive surface which induces the image charge and the electric field generating electrodes can be utilized to effect the principles of the present invention. For example, the electrically conductive surface can actually be an extension of the charging electrode so that as a drop is charged as it comes from the orifice it will immediately begin to change its trajectory as the image charge created on the electrically conductive surface affects the trajectory of the drop.

In such a configuration, as the drop passes through an electric field established by a field electrode generating means downstream from the charging electrode, there is produced a deflection in the trajectory of the drop which is perpendicular to the plane of deflection induced by the electrically conductive surface image force. This causes the drop to be diverted laterally of the electrically conductive surface to thus provide control of the trajectory of the drop in two orthogonal planes.

Alternatively, the electrically conductive surface which induces the image force on the drops can be positioned downstream of the charging electrode and separately therefrom. In fact, the electrically conductive surface can be provided by the electric field generating electrode means. In this configuration, a drop which has been selectively sufficiently charged as it passes alongside the charging electrode, will subsequently be influenced by the electrically conductive surface of the field electrode generating means and at the same time will be deflected in a plane perpendicular to the electrically conductive surface by the electric field established by this second electrode.

This can be accomplished by providing a split plate with potential difference between plates so as to produce an electric field between the plates which then deflects the charged drops in the desired direction and at the desired force level. The potential on the second electrode can be varied in order to increase or decrease the variation of the drop from its original trajectory.

Referring further to the above described alternative construction, it can be seen that if a sufficiently high charge level is placed on the drop by the charging electrode it will have a great enough attraction to the electrically conductive surface to be pulled into a catcher disposed therebeneath. If, on the other hand, the drop is charged with a lesser charge, it will be attracted towards the electrically conductive surface but not sufficiently so that it will be caught by the catching mechanism and will thus impact the recording medium.

This latter charged drop will also be influenced by the electrical field established in the second electrode so that it will be laterally displaced from its initial trajectory in a plane perpendicular to the plane in which deflection due to the self-induced image force is created. In order to effect this latter deflection, the charge imposed on the drop by the charging electrode can be varied while the second electrode charge is held constant, or vice versa. It is believed that in the higher speed printing devices variation of the charge placed on the drops by the charging electrode is preferable to variation of the electric field on the electric field generating electrode and that the latter can be used for the relatively slower printing apparatus.

DETAILED DESCRIPTION OF THE PREFERRED EMBODIMENT AND METHOD

Figure 1:
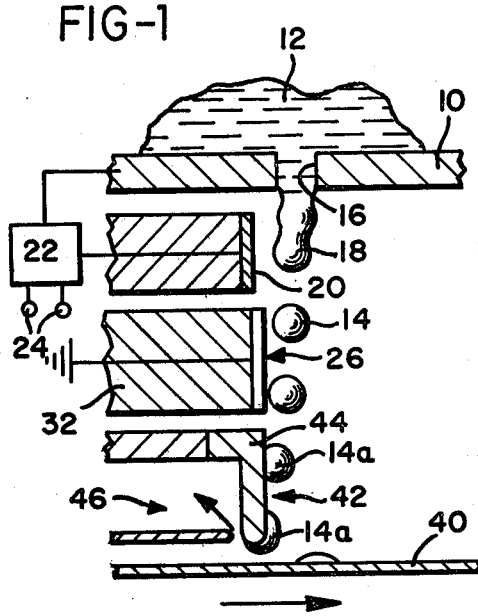
FIG. 1 is a schematic representation of a single orifice of a multiple orifice ink jet printing device, positioned above a moving web of recording medium looking transverse to the direction of movement of the medium.

Referring to FIG. 1, a conventional orifice plate 10 is provided secured to a manifold (not shown) supplying a reservoir of printing liquid 12 under pressure in a well known manner. A series of drops 14 are created by expelling the liquid 12 through the orifice 16 defined in orifice plate 10 and are formed in a progression of uniformly spaced drops at the end of the filaments 18 which extends from the orifice. Drop generation can be accomplished by any of several known techniques and forms no part of the present invention.

Adjacent the end of filament 18 where drops 14 are formed is a charging electrode 20 which is used to place a charge of desired amplitude and sign on each drop as it breaks away from the filament 18. Electrode 20 is connected to a source of electric potential 22. The other side of the source 22 is connected to orifice plate 10 for control of the potential of filament 18. The electrical source 22 produces a potential difference between electrode 20 and filament 18 in response to a control signal applied to input terminals 24. As is well known in the art, the potential difference causes electrical charges to appear on the filament 18 and some of this charge is carried away by the drops 14 when they separate.

Figure 2:
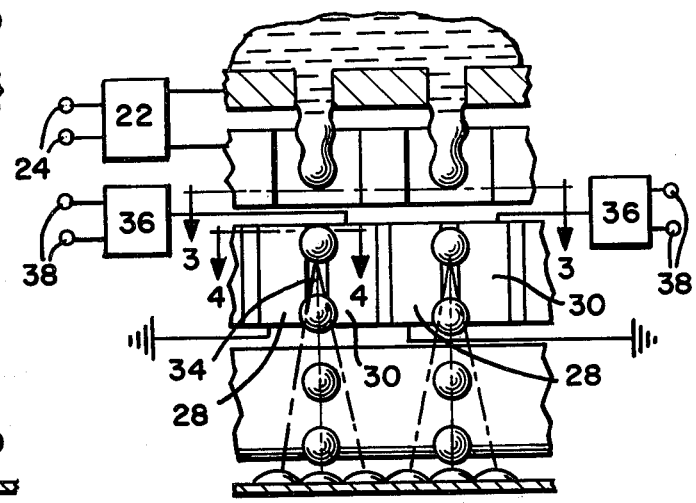
FIG. 2 is a schematic representation of two orifices in the ink jet printing device of the embodiment illustrated in FIG. 1, looking upstream in the direction of movement of the recording medium.

Immediately downstream of electrode 20 is a second electrode means 26 for generating an electric field and which, as best seen in FIG. 2, is really composed of a pair of electrode plates 28 and 30. Plates 28 and 30 are supported by a non-conductive base member 32 and are separated by a gap 34 preferably of less than the diameter of drops 14. Electrodes 26 are connected to an electrical potential source 36 which establishes a desired level of potential and sign in response to a control signal applied to terminals 38.

Plates 28 and 30 also provide electrically conductive surfaces which, as is described in more detail below, permits a self-induced image charge to be developed between the drops 14 and the plates 28 and 30 when a sufficient charge level is established on the drops 14 by charging electrode 20 such that the drops are attracted towards the plates. Plates 28 and 30 are disposed symmetrically about a vertical plane through the gap 34 normal to their front surfaces and containing the initial trajectory of drops 14. Thus, the image charge induced by plates 28 and 30 will only deflect the drops 14 in that plane since the plates are symmetrical about it.

It is also to be noted as mentioned in U.S. Pat. No. 3,656,171 referred to above, that the electrically conductive surface which induces the image force in the drops must be non-symmetrical in the plane in which a change in the trajectory of the drop is to be induced by this image force. As explained in the above referred to patent, if this is not the case an equal charge will be induced by a symmetrically opposite electrically conductive surface so that the charges will cancel each other out and the trajectory of the drops will not be changed.

Referring again to FIG. 1, certain of the drops 14, depending upon the charge level placed on the drops by charging electrode 20, will have their trajectories changed sufficiently by the self-induced image charge as they pass the second electrode means 26, to impinge upon the catcher 42 in order to prevent them from impacting the recording medium 40. Catcher 42 is of well known construction and essentially consists of a front catching surface 44 usually of relatively porous material, and a vacuum chamber 46 which provides a vacuum at the lower end of the surface 44 so that the drops 14a which impinge upon the surface 44 and migrate downwardly therealong are drawn into the reservoir 46 and either returned to the reservoir 12 or disposed of.

Figure 3:
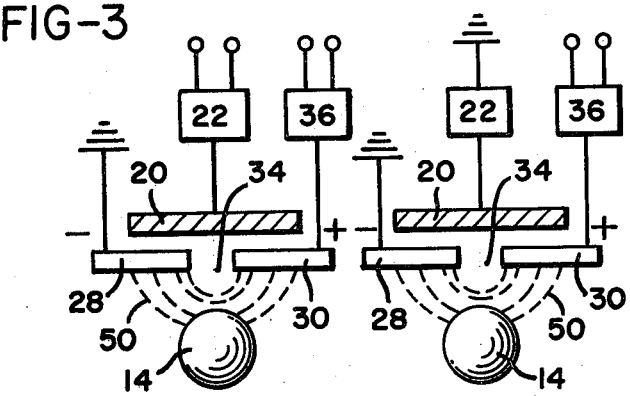
FIG. 3 is a schematic top cross-sectional view of the electrode in the direction of line 3—3 in FIG. 2.
Figure 4:
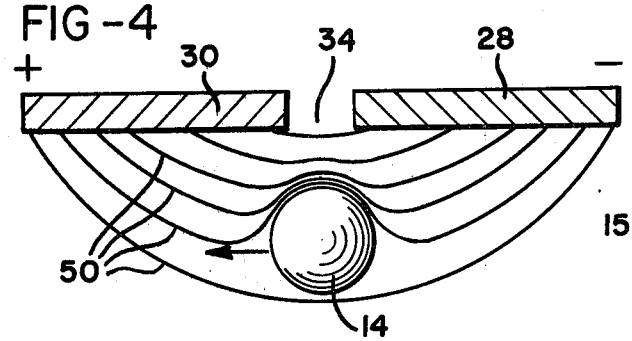
FIG. 4 is an enlarged schematic cross-sectional view of a second electrode of the preferred embodiment looking in the direction of line 4—4 in FIG. 2.

As mentioned above, as drops 14 pass by the second electrode means 26, they are subjected to an electrical field between plates 28 and 30, as best seen in FIGS. 3 and 4. The electrical field is illustrated as having a plurality of equal field lines 50 extending across the gap between plates 28 and 30 in the path of drops 14. Depending upon the sign of the potential on the plates and the magnitude of the potential difference, a lateral variation in the trajectory of drop 14 will be produced. For example, if a negative charge is applied to the surface of drops 14 by the charging electrode 20 and a positive potential is established on plate 30, the drops 14 will be deflected to the left as shown in FIG. 4.

The extent to which drops 14 are deflected will depend upon the strength of the electrical field established between plates 28 and 30. Either varying the strength of the electric field between plates 28 and 30 or varying the strength of the charge on drops 14 established by charging electrode 20, will effect lateral displacement of the drops.

Changing the sign of the electric field on the second electrode means 26, i.e., placing a positive charge on plate 28 and the negative charge on plate 30, while maintaining the negative charge on drops 14 will cause drops 14 to move in the opposite direction. Likewise, a change in the sign of the charge applied to drops 14 by charging electrode 20 will change the direction in which the drops 14 are diverted by the electric field established between plates 28 and 30.

Figure 5:
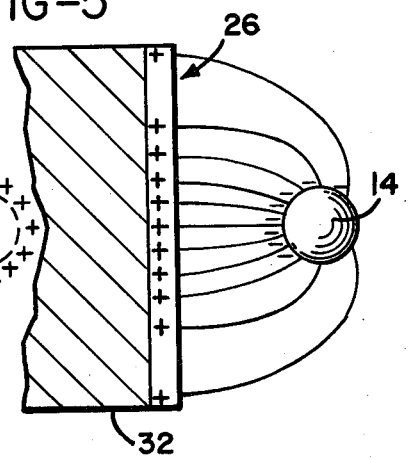
FIG. 5 is a schematic representation of the electrically conductive surface and the self-induced image charge imposed on a drop in accordance with the present invention.

As discussed in greater detail in U.S. Pat. No. 3,656,171, referred to above, the relationship between the self-induced image charge established between the drops 14 and the electrically conductive surface of the second electrode means 26 is complex. In effect it can be analogised to the existence of an image drop 15 with charges of opposite sign and equal potential arranged around it as illustrated in FIG. 5. In any event, the effect is to produce an attractive charge between the conductive surface and the charged drops so that when a drop has a sufficiently high charge it will be attracted to the electrically conductive surface with a sufficient force to divert the drop to a new trajectory which will impinge on the catcher 42.

Although the electrically conductive surface is described as being provided by plates 28 and 30 which also form the second electrode means 26, it is possible that the first electrode means 20 could be used to supplement or replace the self-induced image forces imposed by the second electrode means 26.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. A particle trajectory control apparatus for use with a liquid particle producing apparatus which produces a continuous series of regularly spaced and uniformly sized particles on an initial trajectory from an orifice, comprising:
   charging electrode means disposed adjacent said orifice for selectively placing a charge on some of said particles;
   electric field generating electrode means disposed downstream from said charging electrode means and having a pair of oppositely charged surfaces disposed in a plane adjacent and parallel to said initial trajectory and defining a gap in said plane such that said surfaces are normal to and on opposite sides of a plane containing said initial trajectory, said charged surfaces supporting an electrical field across said gap through which said particles pass such that selectively sufficiently charged particles will be diverted from their initial trajectories;
   at least one of said electrode means having an electrically conductive surface adjacent said plane containing said initial trajectory such that a self-induced image attractive force will be created between said conductive surface and selectively sufficiently charged particles so as to change the trajectories thereof; and
   means for selectively producing charges of predetermined magnitude and sign on both said electrode means.

2. A particle trajectory control apparatus as defined in claim 1 wherein said field generating electrode means includes said conductive surface, said conductive surface being so disposed that said change in the trajectory of a charged particle caused by said field will be in said plane containing said initial trajectory.

3. A particle trajectory control apparatus as defined in claim 2 wherein said field generating electrode means includes said electric field acting upon said charged particles substantially normal to said plane containing said initial trajectory so that said charged particles will be diverted laterally of said last mentioned plane.

4. A particle trajectory control apparatus as defined in claim 3 wherein the width of said gap is less than the diameter of said particles.

5. A particle trajectory control apparatus for use with a liquid particle producing apparatus which produces a continuous series of regularly spaced and uniformly sized particles from an orifice, comprising:
   charging electrode means disposed adjacent said orifice for selectively placing a charge upon some of said particles;
   electric field generating electrode means disposed downstream of said charging electrode means and having a pair of oppositely charged electrically conductive surface portions defining a gap in a plane adjacent and parallel to the initial trajectories of said particles and capable of supporting an electric field across said oppositely charged surface portions through which said particles pass such that said charged particles will be diverted from their initial trajectories due to said field, and a self-induced image attractive force will be created between said electrically conductive surface portions and at least some of said charged particles so as to further change the trajectories thereof; and
   means for selectively producing charges of predetermined magnitude and sign on both said electrode means.

6. A particle trajectory control apparatus as defined in claim 5 wherein said field generating electrode means is so disposed relative to said initial trajectories of said particles such that said change in trajectory of said charged particles induced by said electric field is substantially normal to the change in trajectory of said at least some of said charged particles induced by said conductive surface.

7. Fluid drop recording apparatus such as an ink jet printer or the like having means for producing a series of uniformly sized and regularly spaced drops from a plurality of orifices, which drops are selectively controlled to be deposited on either a catching device or a recording surface, said apparatus comprising:
   charging means for selectively producing a charge of predetermined magnitude and sign on some of said drops issuing from said orifices;
   deflection means having adjacent oppositely charged surfaces disposed downstream from said charging means and defining a gap in a plane adjacent an initial drop trajectory and capable of supporting an electric field of predetermined magnitude and sign across said oppositely charged surfaces through which said drops pass, such that selectively sufficiently charged drops will be laterally diverted from their trajectories in a direction parallel to said plane and impinge upon said recording surface, said charged surfaces being electrically conductive and so disposed that a self-induced image attractive force will also be created between said surfaces and some selectively sufficiently charged drops so as to change the trajectories thereof in a direction towards said plane sufficiently to cause said some of said selectively charged drops to be caught by said catching device; and said catching device being disposed downstream of said deflection means.

8. Fluid drop recording apparatus as defined in claim 7 wherein said recording surface is a continuously moving web of material and said plurality of orifices are disposed in a plane parallel to said web and extending widthwise thereof transverse to the direction of movement of said web, said electrically conductive surfaces being so disposed that said self-induced image force causes said change in trajectory of said some of said sufficiently charged drops in a plane extending in the direction of movement of said web and said electric field diverts said other charged drops transversely of said web.

9. A method of controlling the trajectory of liquid particles issuing from an orifice, comprising the steps of:

selectively placing a charge of predetermined magnitude and sign on some of said particles as they leave said orifice;

passing said particles by an electrically conductive surface so that some of said selectively charged particles will induce an image charge on said surface sufficient to divert said some of said selectively charged particles from their initial trajectories in a plane normal to said surface to a position where they will be caught by a catching means and all other of said particles will pass said catching means and impinge a recording surface; and applying an electric field of predetermined magnitude and sign across the path of said particles such that said other of said charged particles will be diverted from their initial trajectories in a plane parallel to said electrically conductive surface and will impinge upon said recording surface.

10. A method as defined in claim 9 wherein said step of placing a charge on some of said particles includes placing a higher magnitude of charge on those of said particles to be caught by said catcher means.

11. A method as defined in claim 10 wherein said step of applying said electric field includes applying an electric field of constant magnitude and sign so that variation in particle trajectory parallel to said surface is controlled by varying the charge placed on said particles.

12. A method as defined in claim 10 wherein said step of applying said electric field includes varying the magnitude and sign of the electric field so that variation in particle trajectory parallel to said surface is controlled by said electric field.

13. A method of recording using a printing liquid supplied under pressure to a plurality of aligned orifices from which a progression of uniform size and spaced drops are generated and selectively impinge on a recording medium or are caught by a catching means, the steps comprising:

placing a charge of predetermined level and sign on some of said drops;

passing said drops by an electrically conductive surface so that some of said charged drops will induce an image charge on said surface sufficient to divert said some of said charged drops from their initial trajectories in a plane normal to said surface to a position where they will be caught by said catching means and all other of said drops will pass said catching means and impinge said recording medium; and applying an electric field of predetermined magnitude and sign across the path of said drops such that said other of said charged drops will be diverted from their initial trajectories in a plane parallel to said electrically conductive surface and will impinge upon said recording medium.

14. A method as defined in claim 13 wherein said step of placing a charge on some of said drops includes placing a higher magnitude of charge on those of said drops to be caught by said catcher means.

15. A method as defined in claim 14 wherein said step of applying said electric field includes applying an electric field of constant magnitude and sign so that variaton in drop trajectory parallel to said surface is controlled by varying the charge placed on said drops.

16. A method as defined in claim 14 wherein said step of applying said electric field includes varying the magnitude and sign of the electric field so that variation in drop trajectory parallel to said surface is controlled by said electric field.

17. Jet drop printing apparatus comprising:

drop generating means for generating drops of printing liquid and projecting them in a stream following an initial trajectory, charging means for selectively charging some of said drops to achieve a first charge state and causing the remainder of said drops to assume selected charge levels from among a plurality of charge levels comprising a second charge state, all of the charge levels comprising said second charge state having an absolute magnitude which is less than the absolute magnitude of the charge level of drops charged to said first charge state, an electrically conductive surface adjacent said stream for producing images of the charges on said drops and causing drop deflection in correspondence with the absolute magnitude of drop charge in a first direction theretoward, field generating means for generating an electrical field extending across said initial trajectory in a second direction different from said first direction and causing drop deflection parallel to said second direction in correspondence with the magnitude and polarity of drop charge, catching means extending parallel to said second direction and offset in said first direction from said first trajectory for catching all and only those drops characterized by said first charge state and correspondingly deflected in said first direction, and transport means for transporting a print receiving member across the path of said initial trajectory so that drops characterized by said second charge state deposit thereon in positions determined by the deflecting effect of said field.

18. Apparatus according to claim 17 wherein said electrically conductive surface is defined by the surfaces of two separated coplanar plates arranged symmetrically with respect to said initial trajectory and further wherein said field generating means comprises means for impressing different electrical potentials upon said plates.

19. Apparatus according to claim 18 and further comprising means for varying said potential difference to vary said field.

* * * * *